G. PROSSER.
CUTTING DEVICE.
APPLICATION FILED JAN. 16, 1918.
1,301,875.
Patented Apr. 29, 1919.
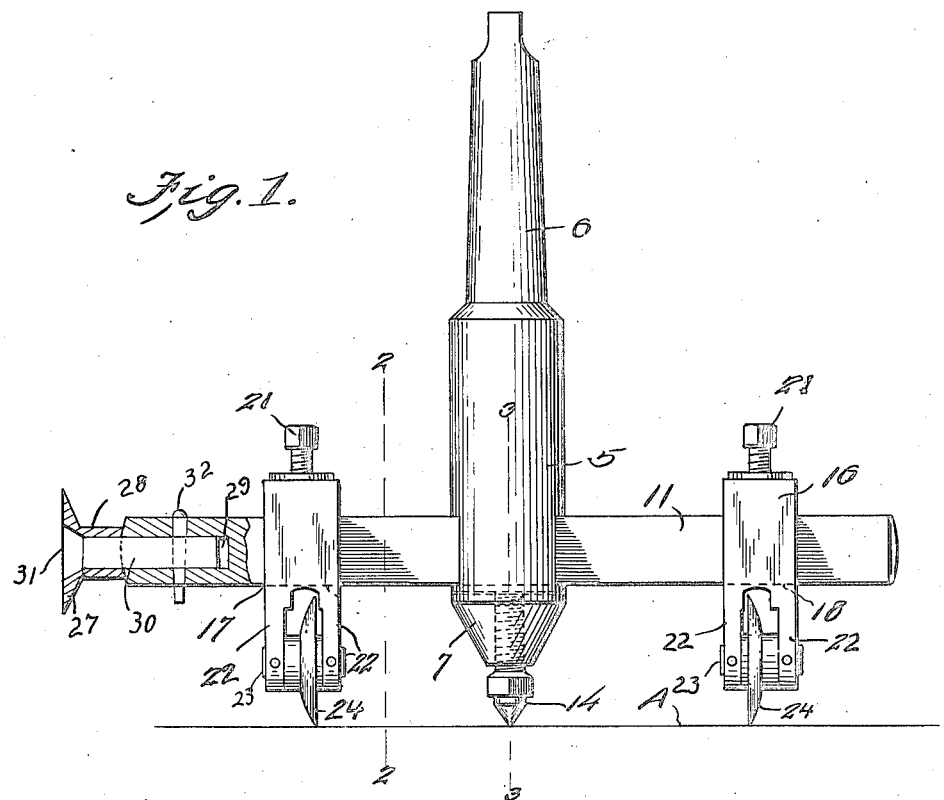
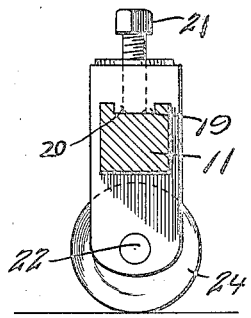
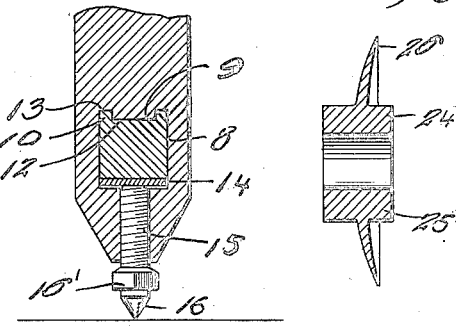
WITNESSES
INVENTOR
George Prosser
BY
ATTORNEY

UNITED STATES PATENT OFFICE.

GEORGE PROSSER, OF PORTLAND, OREGON.

CUTTING DEVICE.

1,301,875.

Specification of Letters Patent.  Patented Apr. 29, 1919.

Application filed January 16, 1918. Serial No. 212,087.

*To all whom it may concern:*

Be it known that I, GEORGE PROSSER, a citizen of the United States, residing at Portland, in the county of Multnomah and State of Oregon, have invented certain new and useful Improvements in Cutting Devices, of which the following is a specification.

My invention relates to cutting devices and has particular reference to a rotary cutting device.

The principal object of the invention is to provide a rotary cutter principally adapted to cutting gaskets, washers, disks from fiber, rubber, etc.

A second important object of the invention is to provide a device of the above character, the cutting blades of which will become sharper the more the device is used.

It is another object of the invention to provide a rotary cutter which embodies cutting knives, which may be adjusted with respect to each other whereby the same will travel in a circle to cut a disk; or which may be adjusted so as to cause the knives to travel in circles of different radii and thereby cut the material in the form of an annulus or gasket, etc.

A further object of the present invention resides in the provision of a rotary cutter, the cutters of which may be readily and quickly adjusted and which will be positively held in such adjusted position.

Another important object of this invention is to provide a cutting device of the above mentioned character which is simple in construction, which consists of few parts which may be readily assembled and disassembled, and which may be manufactured and placed on the market at a minimum cost.

The above objects together with others will be fully apparent from this disclosure, and the inventive features will be explicitly defined in the appended claim.

The invention consists of combinations, arrangements and details of construction which will be hereinafter specifically referred to and illustrated in the accompanying drawing; wherein, Figure 1 shows an elevation of my improved cutter, Fig. 2 is a vertical section view taken on a line 2—2 of Fig. 1, Fig. 3 is a right view taken on a line 3—3 of Fig. 1, and Fig. 4 is a sectional view of one of my improved cutting knives used on the device.

On a drawing wherein like characters of reference designate like parts in all the views, the numeral 5 designates a relatively heavy tool bar holder which is formed with a shank 6, adapted to be mounted in a drill press or any other rotating tool-holder. The lower end of this member 5 is tapered as indicated by the numeral 7. Formed in the member 5 and extending transversely of the same is a substantially rectangular opening 8 which extends the entire diameter of this member 5. The upper wall of this opening 8 is provided with a longitudinal tongue 9 which is rectangular in cross section. The vertical sides of the tongue 9 are spaced from the vertical walls of the opening 8 and afford longitudinal grooves 10.

Mounted in the opening 8 is a rectangular bar 11 which is adjustable longitudinally with respect to the member 5. This bar 11 is formed with a longitudinal groove 12 in its upper face, which receives the tongue 9. This groove 12 affords ribs or tongues 13 which are accommodated in the grooves 10. Interposed between the under face of the bar 11 and the bottom wall of the opening 8 is a friction plate 14.

Threaded in the tapered end 7 of the holder 5 is a shank 15 which is formed with a centering point 16. This shank 14 is formed with a many sided enlargement 16', by means of which the shank 14 may be threaded into and from the holder 5.

Mounted on the bar 11 upon opposite sides of the holder 5 are knife carriers 17 and 18. Each of the knife carriers is provided with an opening 19 which snugly receives the bar 11. Like the opening 8 in the holder 5 the upper wall of each of the openings 19 is formed with a tongue 20 that is snugly accommodated in the groove 12 in the bar 11. A set screw 21 is carried by each of the carriers 17 and is adapted to engage the bar 11 and retain these holders in relative adjusted positions.

Bearing arms 22 depend from the carriers 17, in each pair of which is mounted a shaft 23. Rotatably mounted on the edge of the shaft 23 is a rotary cutter 24. Each of these cutters 24 comprises a hub 25, each of which is loosely accommodated on one of the shafts 23 and between each pair of the bearing arms 22. Formed on each of the hubs 25 is a concavo-convex cutting disk 26 which gradually tapers in thickness toward its peripheral cutting edge. These rotary cutters are mounted so that the concave faces are opposed to each other. Owing to the shape of the cutting disks 26 they will not become worn but to the contrary, they will become sharper the more the device is used.

In using my improved cutter the carriages 17 are adjusted equal distances from the holder 5 if it is desired to cut a disk. The centering point 15 and the cutters 24 are placed upon the sheet of material A and rotary motion imparted to the shank 6. If it is desired to cut an annulus the carriages 17 are adjusted so that one is a greater distance from the holder 5 than the other, as clearly illustrated in Fig. 1.

In order "to turn up" the paper disks, washers, etc., I have provided a third cutter 27 which is to be attached to one end of the bar 11 as shown in Fig. 1. This latter cutter is provided with a flat outer face and a beveled inner face and has a collar 28 formed integral with the inner face thereof. This collar is provided with an axial bore having one end made flaring and opening into the flat face of the cutter. One end of the bar 11 is drilled to provide a suitable bore 29 and the cutter is to be fastened to the end of this bar with the bore of the collar 28 alined with the bore of the bar 11. An axial fastening pin 30 is adapted to be passed through the cutter and collar 28 and to be received in the bore 29 and this pin is provided with an enlarged head 31 adapted to be countersunk in the outer face of the cutter. A tapered pin 32 is passed transversely through the end of the bar 11 and through the axle pin 30 to securely hold the cutter in proper engagement with the end of the bar.

When it is desired to use this third cutter, the adjustable cutter adjacent the opposite end of the bar 11 is removed and the bar is then withdrawn from the holder 5 and the remaining adjustable cutter may then be removed. In use, the bar 11 is adapted to be attached to the tool holder of a lathe or like machine and operated in the usual manner.

While this form of the invention illustrates in general my idea, I wish to here state that the inventive idea may be embodied in other constructions and further, it is to be understood that my limits of modifications are only governed by the appended claim.

I claim:—

In a device of the character described, the combination of a tool bar holder having a shank extending therefrom and provided with a tapered lower end, said holder having a rectangular opening extending transversely therethrough and being provided with a tongue extending down into the opening to form side grooves, a centering point having a threaded shank extending through the tapered end of said holder and projecting into said opening, an elongated supporting bar having a longitudinal groove in one edge thereof thus forming parallel ribs upon each side of the groove, whereby said bar may pass through the opening of said holder and receive said tongue, thus causing the fitting of the ribs within said grooves to steady the bar, a friction plate carried within said opening and engaging the under surface of said bar, said stem bearing upon said friction plate to firmly hold the same in a set position whereby the bar will be held against accidental shifting, knife carriers comprising elongated vertical bodies having transverse openings therein, said carriers having tongues extending into the openings to fit within the groove of said bar, set screws carried by said carriers and binding upon said bar within the groove thereof, thus binding said carriers in set positions upon said bar, and rotary cutters carried by said carriers.

In testimony whereof I affix my signature in presence of two witnesses.

GEORGE PROSSER.

Witnesses:
   CHAS. GREGORY,
   WILLIAM GREGORY.